(12) United States Patent
Kundu et al.

(10) Patent No.: US 9,710,867 B2
(45) Date of Patent: Jul. 18, 2017

(54) COMPUTER IMPLEMENTED SYSTEM AND METHOD FOR DETERMINING GEOSPATIAL FIRE HAZARD RATING OF AN ENTITY

(71) Applicant: Tata Consultancy Services, Ltd., Maharashtra (IN)

(72) Inventors: Biswaketan Kundu, Andhra Pradesh (IN); Praveen kumar Talagadadeevi, Andhra Pradesh (IN); Suresh Bhaskaramurthy, Tamil Nadu (IN); Niranjan Vallur Nagarajan, Tamil Nadu (IN); Neha Sharma, Andhra Pradesh (IN)

(73) Assignee: TATA CONSULTANCY SERVICES, LTD., Maharashtra (IN)

( * ) Notice: Subject to any disclaimer, the term of this patent is extended or adjusted under 35 U.S.C. 154(b) by 306 days.

(21) Appl. No.: 14/663,729

(22) Filed: Mar. 20, 2015

(65) Prior Publication Data

US 2016/0275087 A1 Sep. 22, 2016

(51) Int. Cl.
*G06F 17/30* (2006.01)
*G06Q 50/26* (2012.01)

(52) U.S. Cl.
CPC ..... *G06Q 50/265* (2013.01); *G06F 17/30241* (2013.01); *G06F 17/30864* (2013.01); *G06F 17/30991* (2013.01)

(58) Field of Classification Search
CPC ......... G06F 17/30241; G06F 17/30864; G06F 17/30991

(Continued)

(56) References Cited

U.S. PATENT DOCUMENTS 5,842,148 A 11/1998 Prendergast et al.
7,277,864 B2 * 10/2007 Ohnemus ........... G06Q 30/0201
705/7.29

(Continued)

FOREIGN PATENT DOCUMENTS

WO 01/63534 A2 8/2001
WO 2004/059420 A2 7/2004

(Continued)

OTHER PUBLICATIONS

"GIS for the Insurance Claims Process: Five Steps for an Effective Workflow", esri, esri.com, An Esri(R) White Paper, Apr. 2012, 23 pages.

(Continued)

*Primary Examiner* — Shahid Alam
(74) *Attorney, Agent, or Firm* — Westman, Champlin & Koehler, P.A.

(57) ABSTRACT

A computer implemented system and method for determining geospatial fire hazard rating of an entity is envisaged. The entity represents any object, structure, or any physical article that is susceptible to fire due to its properties, placement and surrounding environment. The system of the present disclosure takes into consideration an inherent fire hazard rating value of the entity and calculates a final fire hazard rating by considering various factors based on entity's geospatial information. These factors may increase the probability of susceptibility to fire for the entity or they may be safety factors decreasing the total fire hazard rating thereby providing a safety measurement for the entity in a particular environment.

14 Claims, 1 Drawing Sheet

(58) Field of Classification Search
 USPC .......................................................... 707/709
 See application file for complete search history.

(56) References Cited

U.S. PATENT DOCUMENTS

| | | | | |
|---|---|---|---|---|
| 7,509,230 | B2* | 3/2009 | Fernandez | ............. G06Q 30/02 |
| | | | | 702/179 |
| 8,255,271 | B2* | 8/2012 | Ohnemus | ........... G06Q 30/0201 |
| | | | | 705/7.38 |
| 8,355,934 | B2 | 1/2013 | Virdhagriswaran | |
| 8,386,280 | B2 | 2/2013 | Mathai et al. | |
| 8,504,393 | B2 | 8/2013 | Stewart et al. | |
| 8,543,430 | B1 | 9/2013 | Fields et al. | |
| 2003/0167187 | A1* | 9/2003 | Bua | ....................... G06F 19/324 |
| | | | | 705/2 |
| 2004/0186753 | A1 | 9/2004 | Kim et al. | |
| 2006/0059073 | A1* | 3/2006 | Walzak | .................. G06Q 40/00 |
| | | | | 705/35 |
| 2007/0202483 | A1* | 8/2007 | Castelli | ............ G06Q 10/06393 |
| | | | | 434/350 |
| 2008/0300924 | A1 | 12/2008 | Savage et al. | |
| 2011/0153368 | A1 | 6/2011 | Pierre et al. | |
| 2012/0232939 | A1 | 9/2012 | Pierre et al. | |
| 2013/0073336 | A1 | 3/2013 | Heath | |
| 2013/0144527 | A1* | 6/2013 | Kuhnreichi | ........ G01N 33/0075 |
| | | | | 702/2 |
| 2013/0226625 | A1 | 8/2013 | Stewart et al. | |
| 2014/0195275 | A1 | 7/2014 | Pershing et al. | |
| 2014/0278703 | A1* | 9/2014 | Owens, Jr. | ....... G06Q 10/06313 |
| | | | | 705/7.23 |
| 2015/0235153 | A1* | 8/2015 | Du | ....................... G06Q 50/163 |
| | | | | 705/7.28 |
| 2016/0012542 | A1* | 1/2016 | Steben | ................... G06Q 40/08 |
| | | | | 705/4 |

FOREIGN PATENT DOCUMENTS

| | | |
|---|---|---|
| WO | 2004/088561 A1 | 10/2004 |
| WO | 2009/146184 A2 | 12/2009 |
| WO | 2013/126866 A1 | 8/2013 |
| WO | 2013/188337 A2 | 12/2013 |

OTHER PUBLICATIONS

"GIS for Insurance", GIS Best Practice Series, Mar. 2012, esri, 39 pages.

* cited by examiner

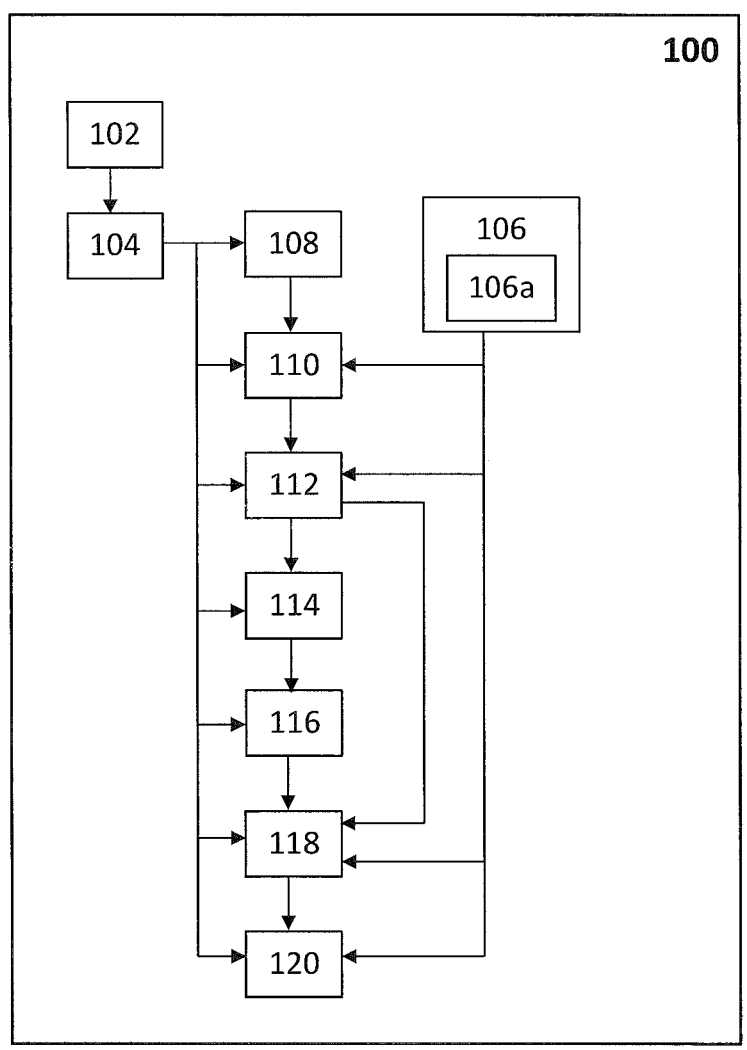

COMPUTER IMPLEMENTED SYSTEM AND METHOD FOR DETERMINING GEOSPATIAL FIRE HAZARD RATING OF AN ENTITY

FIELD OF THE DISCLOSURE

The present disclosure relates to the field of fire hazard ratings based on the geospatial information.

DEFINITIONS OF TERMS USED IN THE SPECIFICATION

The expression 'entity' used hereinafter in this specification refers to an object of material existence which is susceptible to fire and includes installation, fixed or movable apparatus, structure, building, equipment, tenement and the like.

The expression 'geospatial fire hazard' used hereinafter in this specification refers to hazard to an entity due to fire based on data associated with the location of entity in a defined environment.

The expression 'inherent fixed fire hazard value' used hereinafter in this specification refers to a fixed fire hazard value associated to an entity due to its properties. This inherent fixed fire hazard value is a permanent fixed value that may be provided by the manufacturer/producer of the entity based on the characteristics and attributes of the entity.

These definitions are in addition to those expressed in the art.

BACKGROUND

Fire typically causes physical damage to properties and disruption in day to day lives of people based on the where the fire has occurred. There are numerous causes of fire occurrences in houses where fire is caused due to cooking and heating equipment, electrical and electronic appliances etc. Usually, the appliances, equipment and edifices/properties that possess fire threat are allotted a fire hazard rating. But, such rating alone does not provide a measure for probable fire as the hazard factor of any appliance, equipment, edifice and the like varies based on the surroundings in which it is being used/placed.

In order to assess safety at a specific location for any entity (electronic appliances, object of daily use or commercial properties etc.), it is essential that a person needs to personally analyze all the possible causes and strategize accordingly to get a clear picture of the fire hazard that may be faced in future by the entity. This is a lengthy and unreliable process. Additionally, the hazard rating currently provided in relation to the entities is of single dimension as all the factors considering the placement of the entity are not covered while achieving the fire hazard rating.

Therefore, there is a need for a system that limits the aforementioned drawbacks and provides a fire hazard rating for an entity based on its geospatial information.

OBJECTS

Some of the objects of the present disclosure aimed to ameliorate one or more problems of the prior art or to at least provide a useful alternative are described herein below:

An object of the present disclosure is to provide a system for determining fire hazard rating of an entity.

Another object of the present disclosure is to provide a system that determines fire hazard rating of an entity based on geospatial location of the entity.

Further object of the present disclosure is to provide a system that computes a complete fire hazard rating based on inherent fire hazard rating and variable fire hazard value corresponding to an entity based on the geospatial information of that entity.

Yet, another object of the present disclosure is to provide a system that allots weightages to the various factors affecting fire hazard values.

Still, another object of the present disclosure is to provide a system that allots additive and subtractive weightages based on fire hazard and/or safety of the various factors.

Other objects and advantages of the present disclosure will be more apparent from the following description when read in conjunction with the accompanying figures, which are not intended to limit the scope of the present disclosure.

SUMMARY

The present disclosure envisages a system for determining geospatial fire hazard rating of an entity.

Typically, in accordance with the present disclosure, the system for determining geospatial fire hazard rating of an entity comprises a system repository configured to store a pre-determined set of rules and a system processor cooperating with the system repository and possessing functional elements to provide system processing commands based on the pre-determined set of rules. The system further comprises a central repository that stores plurality of types of entities, inherent fixed fire hazard values for respective entities, a plurality of fire hazard factors and a set of pre-determined rules for assigning weightages. The central repository comprises a sub repository configured to store a question bank comprising questionnaire related to the entities. A first input module included in the system accepts under influence of the system processing commands, an entity type and corresponding geospatial information of the entity. The system includes a fire hazard factor identifier which then cooperates with the first input module to receive the accepted entity type and the geospatial information and is configured to identify from the central repository, under influence of the system processing commands, the stored fire hazard factors related to the accepted entity type and the accepted geospatial information. Based on the on geospatial information of the entity and the identified fire hazard factors, a crawler and extractor present in the system is configured to crawl through the sub repository and extract, under influence of the system processing commands, the stored questionnaire. This extracted questionnaire is then displayed on a display. The system comprises a second input module that accepts under influence of the system processing commands, answers to the displayed questionnaire. A weightage allotter present in the system cooperates with the central repository, the second input module and the crawler and extractor to respectively receive the set of pre-determined rules for assigning weightages, the answers to the displayed questionnaire and the identified fire hazard factors and is configured to allot weightages to the identified fire hazard factors based on the answers and the pre-determined rules to obtain weighted fire hazard factors. These weightages are one of additive weightage and subtractive weightage. A computational unit present in the system then cooperates with the central repository and the weightage allotter to respectively receive the inherent fixed fire hazard value for the accepted entity type and the weighted fire hazard factors related to the accepted entity type, and is configured to compute a geospatial fire hazard rating for the entity based on the received inherent fixed fire hazard value and the received weighted fire hazard factors.

In accordance with the present invention, there is provided a computer implemented method for determining geospatial fire hazard rating of an entity. The method comprises the following:

providing system processing commands based on the pre-determined set of rules;

storing in a central repository, a plurality of types of entities, inherent fixed fire hazard values for respective entities, a plurality of fire hazard factors and a set of pre-determined rules for assigning weightages and storing in a sub repository, a question bank comprising questionnaire related to the entities;

accepting under influence of the system processing commands, an entity type and corresponding geospatial information of the entity;

receiving the accepted entity type and the geospatial information and identifying from the central repository, under influence of the system processing commands, the stored fire hazard factors related to the accepted entity type and the accepted geospatial information;

crawling through the sub repository and extracting, under influence of the system processing commands, the stored questionnaire based on geospatial information of the entity and the identified fire hazard factors;

displaying, under influence of the system processing commands, the extracted questionnaire;

accepting under influence of the system processing commands, answers to the displayed questionnaire;

receiving the set of pre-determined rules for assigning weightages, the answers to the displayed questionnaire and the identified fire hazard factors and allotting weightages to the identified fire hazard factors based on the answers and the pre-determined rules to obtain weighted fire hazard factors, wherein the weightages are one of additive weightage and subtractive weightage; and receiving the inherent fixed fire hazard value for the accepted entity type stored in the central repository and the weighted fire hazard factors related to the accepted entity type, and computing a geospatial fire hazard rating for the entity based on the received inherent fixed fire hazard value and the received weighted fire hazard factors.

BRIEF DESCRIPTION OF ACCOMPANYING DRAWINGS

A computer implemented system for determining geospatial fire hazard rating of an entity will now be described with the help of accompanying drawings, in which:

FIG. 1 illustrates a schematic of an embodiment of the system for determining geospatial fire hazard rating of an entity.

DETAILED DESCRIPTION

A preferred embodiment of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present disclosure envisages a system for determining geospatial fire hazard rating of an entity. The entity represents any object, structure, or any physical article that is susceptible to fire due to its properties, placement and surrounding environment. The system of the present disclosure takes into consideration an inherent fire hazard rating value of the entity and calculates a final fire hazard rating by considering various factors based on entity's geospatial information. These factors may increase the probability of fire for the entity or they may be safety factors decreasing the total fire hazard rating thereby providing a safety measurement for the entity in a particular environment.

Referring to the accompanying drawings, FIG. 1 represents a schematic of an embodiment of the system for determining geospatial fire hazard rating of an entity. The system 100 comprises a system repository 102 which stores pre-determined set of rules and a system processor 104 which possesses functional elements to provide system processing commands based on the pre-determined set of rules. These pre-determined set of rules are configurable and can therefore be modified based on certain factors. A central repository 106 present in the system 100 stores plurality of types of entities, inherent fixed fire hazard values for respective entities, plurality of fire hazard factors and a set of pre-determined rules for assigning weightages to the fire hazard factors. The central repository 106 includes a sub repository 106a which stores set of questionnaire specific to entities based on specific geospatial location of the entities and various fire hazard factors. The system 100 automatically retrieve these questionnaire based on entity and its location. The information stored in the central repository 106 as well as the sub repository 106a is configurable. The system processor 104 provides system processing commands to a first input module 108, a fire hazard factor identifier 110, a crawler and extractor 112, a display 114, a second input module 116, a weightage allotter 118 and a computational unit 120 present in the system 100. The first input module 108 accepts an entity type and corresponding geospatial location data of the entity. The entity type is accepted from a user and the geospatial location data is accepted/ collected from smart sensors present within the entity providing GPS coordinates. In one embodiment, the geospatial location data is collected from the address of the location of the entity, and the system 100 resolves the lat/long information related to the entity. For example, if a user needs to determine fire hazard rating 'fhr' for a building in a particular location, the input provided to the first input module 108 will include entity type as building containing details of its attributes along with the location information related to the building. The central repository 106 present in the system 100 includes a stored inherent fixed fire hazard value for the building considering its attributes such as construction class, occupancy type, contents etc. (for example, the inherent fixed fire hazard value is 'k'). Similarly, in case of another example where a user needs to determine 'fhr' for an electric generator placed in the vicinity of a factory, the input provided to the first input module 108 will include entity type as generator containing details of its attributes along with its location information. The central repository 106 includes stored inherent fixed fire hazard value for the generator based on its attributes related to combustion and engine cooling, outlets for exhaust, mounting platforms, open accessibility, isolation etc. The inherent fire hazard value is a non-zero real number that is greater than zero.

The fire hazard factor identifier 110 cooperates with the first input module 108 and based on the accepted entity type and the corresponding geospatial information resolved by the system processor 104 based on the inputted location data, identifies related stored fire hazard factors from the central repository 106. Thus, in this example, the fire hazard factor identifier 110 will identify various factors ($m_1$, $m_2$, . . . and $m_n$) affecting the susceptibility of the building (or the generator in case of another example) to the fire based on the geospatial information related to the building. These identified fire hazard factors related to the building include factors such as proximity of gas pipelines, presence of high voltage wires that can cause electrical arcing, wind speed in the location, seismic activity in the area, previous geographical loss experience, presence of fire stations and their accessibility and the like. In case of the generator, the identified fire hazard factors will include factors such as distance between the factory and the generator, proximity of other generators or equipment, proximity to fire extinguishers, distance from a pipeline or electrical wire and the like. The crawler and extractor 112 present in the system 100 is configured to crawl through the sub repository 106a and extract stored questionnaire corresponding to the entity based on the geospatial location information of the entity and the identified fire hazard factors. This extracted questionnaire is then displayed on the display 114 as geospatial layers with factors and attributes for easy visualization along with other user interactive components. Considering an example, the fire hazard identifier 110 will identify various factors affecting the susceptibility of fire for example presence of gas pipeline 'm1', high tension wires 'm2', previous geographical loss experience 'm3' and presence of fire stations 'm4' etc. The crawler and extractor 112 then searches through sub repository 106a to extract related information and/or questionnaire which is then displayed on the display 114 as layers with attributes for user interactive visualization (pipeline feature layer with attributes details such as pipe diameter, pipe type, fuel type, calorific value etc. or electrical line layer with attributes details such as transmission line voltage, where the user can use geospatial buffering tools to measure the distance or elevation of the building from the gas pipelines/electrical line). In another embodiment, user can choose the past fire related losses (geographical loss experience) that occurred in the vicinity (area of interest) for a specified time frame (say last 3 years), this information is then shown on the map with location, reason for fire incident and loss details etc. for user interaction and visualization. Similarly based on the proximity of the nearby fire stations, the user can visualize possible routes and drive time buffer layers on the map.

The second input module 116 accepts answers to the questionnaire displayed on the display 114 and provides them to the weightage allotter 118. The weightage allotter 118 based on the set of pre-determined rules for assigning weightages stored in the central repository 106 and the answers to the displayed questionnaire, allots weightages to the extracted fire hazard factors obtain weighted fire hazard factors ($a_1m_1$, $a_2m_2$, . . . $a_nm_n$, where $a_1$ to $a_n$ are the weightages based on the answers and set of rules). These weightages are either additive weightages or subtractive weightage. These weightages can also be allotted by accepting weightage values from an authorized person. The fire hazard factors that reduce the susceptibility of fire are allotted subtractive weightage and the ones that increase the susceptibility are allotted additive weightages. The computational unit 120 then computes a geospatial fire hazard rating 'fhr' for the entity (in case of abovementioned examples, the building or the generator) based on the inherent fixed fire hazard value (in this example 'k') and the received weighted fire hazard factors ($a_1m_1$, $a_2m_2$, . . . $a_nm_n$). In one embodiment, the equation for fhr thus obtained can be conceptually represented as follows:

$$fhr = k(a_1m_1 + a_2m_2 + \ldots a_nm_n)$$

where, k>0

Here, the additive weightages result in increased geospatial fire hazard rating thereby having a negative effect on the safety of the entity and the subtractive weightage result in decreased geospatial fire hazard rating thereby having an increased effect on safety value for the entity.

TECHNICAL ADVANCEMENTS

The technical advancements offered by the present disclosure include the realization of:
  a system for determining fire hazard rating of an entity;
  a system that determines fire hazard rating of an entity based on geospatial location of the entity;
  a system that computes a complete fire hazard rating based on inherent fire hazard rating and variable fire hazard value corresponding to an entity based on the geospatial information of that entity;
  a system that allots weightages to the various factors affecting fire hazard values; and
  a system that allots additive and subtractive weightages based on fire hazard and/or safety of the various factors.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system for determining geospatial fire hazard rating of an entity, said system comprising:
  a system repository configured to store a pre-determined set of rules;
  a system processor cooperating with the system repository and possessing functional elements to provide system processing commands based on said pre-determined set of rules;

a central repository configured to store plurality of types of entities, inherent fixed fire hazard values for respective entities, a plurality of fire hazard factors and a set of pre-determined rules for assigning weightages, said central repository comprising a sub repository configured to store a question bank comprising questionnaire related to said entities;

a first input module configured to accept under influence of the system processing commands, an entity type and corresponding geospatial information of said entity;

a fire hazard factor identifier cooperating with the first input module to receive the accepted entity type and the geospatial information and configured to identify from said central repository, under influence of the system processing commands, said stored fire hazard factors related to said accepted entity type and said accepted geospatial information;

a crawler and extractor cooperating with said fire hazard factor identifier and configured to crawl through the sub repository and extract, under influence of the system processing commands, said stored questionnaire based on geospatial information of said entity and said identified fire hazard factors;

a display cooperating with said crawler and extractor and configured to display under influence of the system processing commands, said extracted questionnaire;

a second input module configured to accept under influence of the system processing commands, answers to the displayed questionnaire;

a weightage allotter cooperating with said central repository, said second input module and said crawler and extractor to respectively receive said set of pre-determined rules for assigning weightages, said answers to the displayed questionnaire and said identified fire hazard factors and configured to allot weightages to said identified fire hazard factors based on said answers and said pre-determined rules to obtain weighted fire hazard factors, wherein said weightages are one of additive weightage and subtractive weightage; and a computational unit cooperating with said central repository and said weightage allotter to respectively receive said inherent fixed fire hazard value for said accepted entity type and said weighted fire hazard factors related to said accepted entity type, and configured to compute a geospatial fire hazard rating for said entity based on said received inherent fixed fire hazard value and said received weighted fire hazard factors.

2. The system as claimed in claim 1, wherein said sub repository stores set of questionnaire related to said entities based on geospatial information of said entities and fire hazard factors.

3. The system as claimed in claim 1, wherein said first input module accepts geospatial information of said entity from sensors present within said entity.

4. The system as claimed in claim 1, wherein said geospatial information corresponding to said entity is resolved by said system processor based on location data of said entity.

5. The system as claimed in claim 1, wherein said weightage allotter is configured to allot weightages by accepting weightage values from an authorized person.

6. The system as claimed in claim 1, wherein said additive weightage results in increased geospatial fire hazard rating thereby providing a reduced safety value for said entity.

7. The system as claimed in claim 1, wherein said subtractive weightage results in decreased geospatial fire hazard rating thereby providing an increased safety value for said entity.

8. A computer implemented method for determining geospatial fire hazard rating of an entity, said method comprising the following:

providing system processing commands based on said pre-determined set of rules;

storing in a central repository, a plurality of types of entities, inherent fixed fire hazard values for respective entities, a plurality of fire hazard factors and a set of pre-determined rules for assigning weightages and storing in a sub repository, a question bank comprising questionnaire related to said entities;

accepting under influence of the system processing commands, an entity type and corresponding geospatial information of said entity;

receiving the accepted entity type and the geospatial information and identifying from said central repository, under influence of the system processing commands, said stored fire hazard factors related to said accepted entity type and said accepted geospatial information;

crawling through the sub repository and extracting, under influence of the system processing commands, said stored questionnaire based on geospatial information of said entity and said identified fire hazard factors;

displaying, under influence of the system processing commands, said extracted questionnaire;

accepting under influence of the system processing commands, answers to the displayed questionnaire;

receiving said set of pre-determined rules for assigning weightages, said answers to the displayed questionnaire and said identified fire hazard factors and allotting weightages to said identified fire hazard factors based on said answers and said pre-determined rules to obtain weighted fire hazard factors, wherein said weightages are one of additive weightage and subtractive weightage; and receiving said inherent fixed fire hazard value for said accepted entity type stored in the central repository and said weighted fire hazard factors related to said accepted entity type, and computing a geospatial fire hazard rating for said entity based on said received inherent fixed fire hazard value and said received weighted fire hazard factors.

9. The method as claimed in claim 8, wherein said step of storing a question bank includes step of storing questionnaire related to said entities based on geospatial information of said entities and fire hazard factors.

10. The method as claimed in claim 8, wherein said step of accepting geospatial information of said entity comprises a step of accepting geospatial information from sensors present within said entity.

11. The method as claimed in claim 8, wherein said method includes step of resolving geospatial information corresponding to said entity based on location data of said entity.

12. The method as claimed in claim 8, wherein said step of allotting weightages includes step of accepting weightage values from an authorized person.

13. The method as claimed in claim 8, wherein said additive weightage results in increased geospatial fire hazard rating thereby providing a reduced safety value for said entity.

14. The method as claimed in claim 8, wherein said subtractive weightage results in decreased geospatial fire hazard rating thereby providing an increased safety value for said entity.

* * * * *